United States Patent [19]
Rist

[11] 3,877,555
[45] Apr. 15, 1975

[54] ASSEMBLY CAGE FOR FREE-WHEEL OR BEARING

[75] Inventor: Michel Rist, Boulogne-Billancourt, France

[73] Assignee: Societe Anonyme Francaise Du Ferodo, Paris, France

[22] Filed: June 22, 1973

[21] Appl. No.: 372,615

[52] U.S. Cl................. 192/45; 29/148.4 C; 29/513; 308/217
[51] Int. Cl. ... F16d 41/06; F16d 15/00; F16c 33/46
[58] Field of Search .............. 192/45; 308/217, 201; 29/148.4 C, 513

[56] References Cited
UNITED STATES PATENTS

| | | | |
|---|---|---|---|
| 1,238,309 | 8/1917 | Lockwood | 308/217 |
| 1,250,595 | 12/1917 | Knoth | 308/217 |
| 1,883,085 | 10/1932 | Swart et al. | 308/217 |
| 1,915,118 | 6/1933 | Brown | 308/217 |
| 3,265,349 | 8/1966 | Hamrick | 29/513 X |

FOREIGN PATENTS OR APPLICATIONS

| | | | |
|---|---|---|---|
| 319,728 | 4/1930 | United Kingdom | 29/148.4 C |

Primary Examiner—Allan D. Herrmann
Attorney, Agent, or Firm—Young & Thompson

[57] ABSTRACT

The present invention relates to an assembly cage for the jamming and/or rolling devices of a free-wheel or a rotary bearing, which comprises two coaxial tracks arranged so as to co-operate with said devices, said cage being adapted to extend between said tracks and having a generally cylindrical form with a series of windows in which said devices are housed, said assembly cage further comprising two annular end-plates assembled together by bracing means which serve to define said circular series of windows intended to receive said devices, said bracing means having terminal portions including means for their assembly on said end-plates, said assembly means comprising at least one dove-tail intended to be engaged in an opening formed in each said end-plate, said opening being larger than the section of said terminal portion and the fixing together of said assembly being effected by radial deformation of said end-plates at the level of said openings, on at least one side of said dove-tails.

4 Claims, 17 Drawing Figures

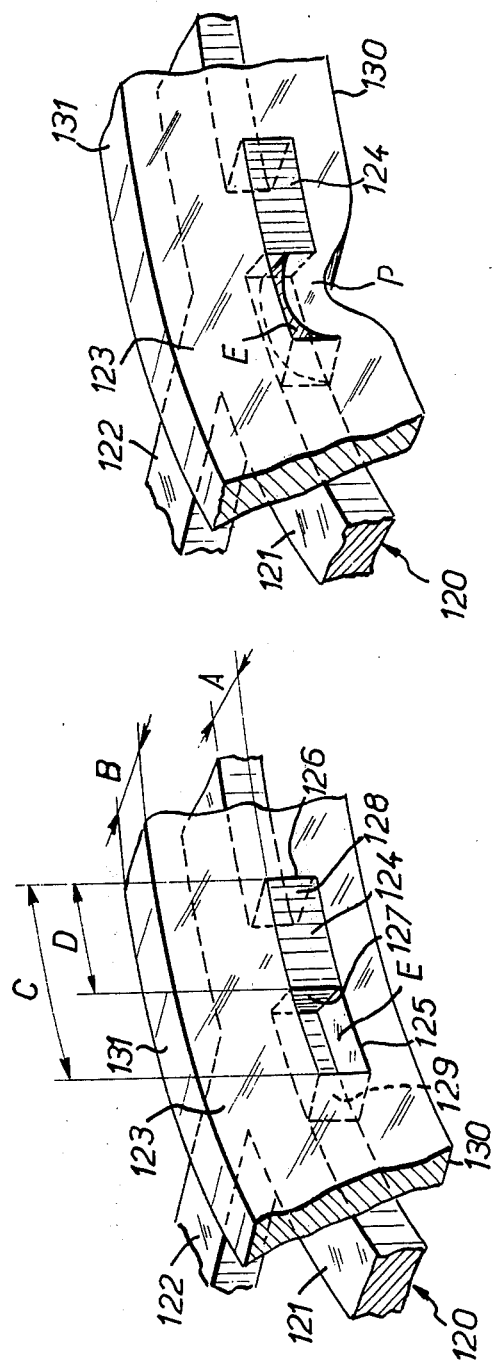

ASSEMBLY CAGE FOR FREE-WHEEL OR BEARING

The present invention relates to an assembly cage for jamming and/or rolling devices for a free-wheel or a bearing, which comprises two coaxial tracks adapted to co-operate with the said devices, the said cage being adapted to extend between the said tracks and having a generally cylindrical shape with a series of windows in which the said devices are housed.

A cage of this kind has the function of retaining the jamming and/or rolling devices, for example rollers, with a uniform circumferential distribution, and also, in the case of a free-wheel, to permit simultaneous wedging action on all the devices.

Assembly cages of this kind have in general a construction which, so as not to be fragile, is either expensive, which loads the price of the free-wheel or the bearing, or alternatively it is bulky, especially in an axial direction, which increases in an undesirable manner the dimensions of the free-wheel or the bearing.

The present invention has for its object an assembly cage for jamming and/or rolling devices for a free-wheel or a bearing which is free from these disadvantages, and the construction of which is at the same time very robust and of small overall size, with a low production cost.

The assembly cage for the said devices according to the invention is characterized in that it comprises two annular end-plates assembled together by spacing means which define the circular series of windows intended to receive the devices, the said spacing means having terminal portions of the bars comprising assembly means with the end-plates, which comprise a dove-tail adapted to be engaged in an opening formed in an end-plate which is larger than the section of the terminal portion, the fixing of the assembly being effected by radial deformation of the end-plates level with the openings, at least on one side of the dove-tails. In one form of construction, the spacing or bracing means comprise a circular series of individual bars, the extremities of which form the said end assembly portions.

In addition to the advantage of permitting the use of bars of hard or hardened metal of good resistance to wear, due to contact of the devices — since they do not have to be deformed themselves at any point whatever for the requirements of the assembly — this arrangement has the advantage of utilizing during the course of this assembly, pressure forces on the end-plates in a direction such that they do not affect the positioning of the bars, this positioning, as is well known, requiring to be accurate for the synchronization of the devices, and the said assembly being the ultimate phase of production of the said cage which in particular is not followed by any heat treatment.

The openings of the end-plates, larger than the section of the terminal portions of the bars, may have any appropriate shape, triangular, rectangular, etc. They are advantageously provided with an arm extending substantially radially, which receives the terminal portion of the bar and at least one arm extending substantially tangentially, which receives the material resulting from the deformation of the end-plate.

According to a characteristic feature of the invention, the opening and the terminal portion of a bar comprise complementary positioning flanks which cooperate between each other so as to define precisely the relative position of the bars.

According to another particular feature of the invention, each bar comprises at least one projection intended to prevent the said devices from passing through the windows; each bar preferably comprises a central projection and two end projections.

The projections of the bars are advantageously constituted by folded portions substantially in the form of a circular arc. For each bar, the two end projections preferably have their concavities orientated in the same direction, while the central projection has a concavity orientated in the opposite direction, advantageously symmetrically.

According to still another special feature of the invention, the projections of the bars extend radially on each side of the said bars.

It will be readily understood that an assembly cage of this kind is particularly easy to produce since, starting with flat elements, its production consists of cutting-out, folding and deforming operations.

In an alternative form, the bracing means comprise a member in the form of a flat ladder including uprights and rungs, and wound to a cylindrical form.

Other characteristic features and advantages of the invention will furthermore be brought out in the description which follows below, given by way of example, reference being made to the accompanying drawings, in which:

FIG. 16 shows a projection of the ladder engaged in a slot of an end-plate before crimping;

FIG. 17 is a view similar to FIG. 16, but showing the end-plate after crimping.

Figure 1:
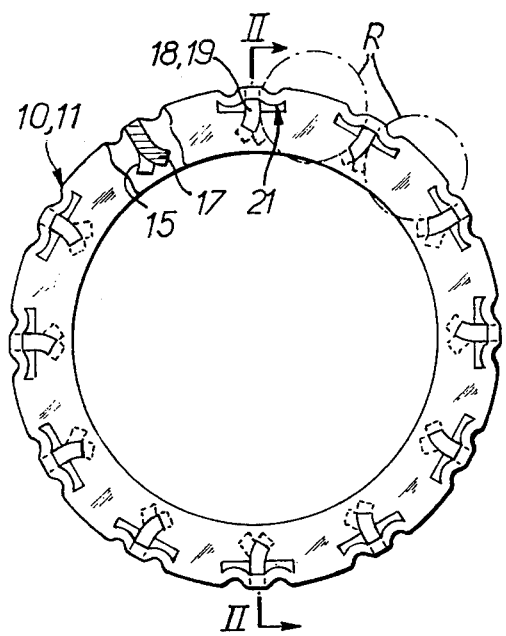
FIG. 1 is a front view in elevation of an assembly cage in accordance with the present invention.

In the form of construction chosen and illustrated in FIGS. 1 to 8, the assembly cage comprises two circular end-plates 10 and 11 coupled together by a circular series of bars 12.

Referring more particularly to FIGS. 4 to 7, it can be seen that the bars, initially made from a flat metal sheet, are cut-out and folded so as to show a central projection 17 between the two end projections 15 and 16.

The above-mentioned projections are symmetrical on each side of a central plane X—X and have a profile substantially of the shape of a circular arc.

Beyond the terminal projections, each bar 12 comprises a dove-tail 18 intended to co-operate with the substantially vertical arm of a T-shaped opening formed in the end-plates, and which is indicated generally at 21.

Figure 2:
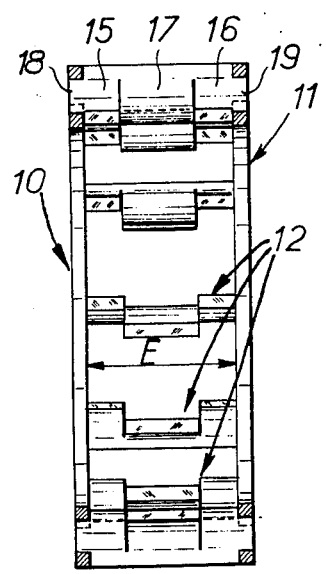
FIG. 2 is a view in cross-section, taken along the line II—II of FIG. 1.

As can be seen, the bases 19 of the dove-tails form supporting shoulders for the end-plates, and at the same time determine the distance apart E of the end-plates 10 and 11 (see FIG. 2).

This T-shaped opening 21 is in the vicinity of the outer edges of the end-plates, and its horizontal arm 22 is straight, while its vertical arm 23 is made with the shape of a circular arc having a radius equal to that of the terminal projections.

Figure 3:
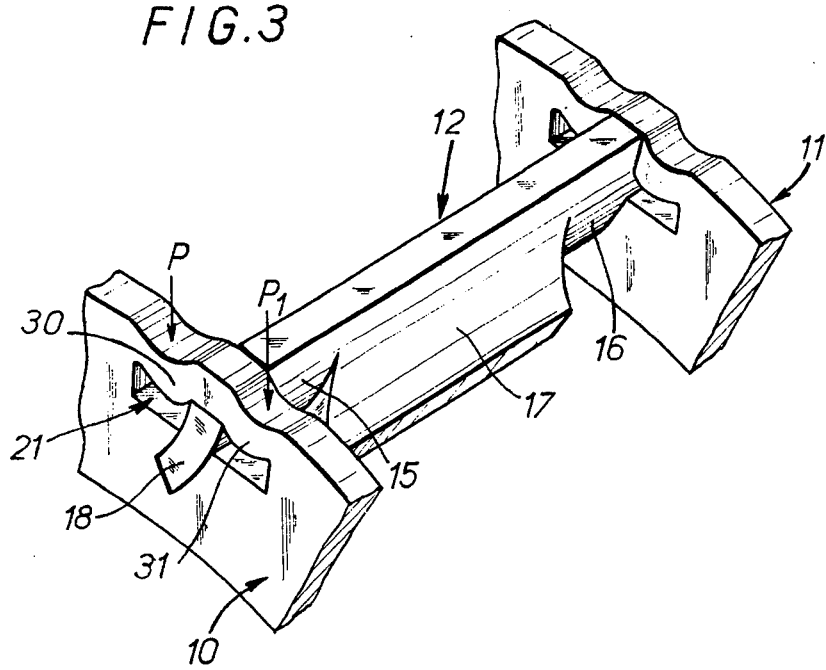
FIG. 3 is a perspective view of the assembly of a bar and two end-plates.
Figure 4:
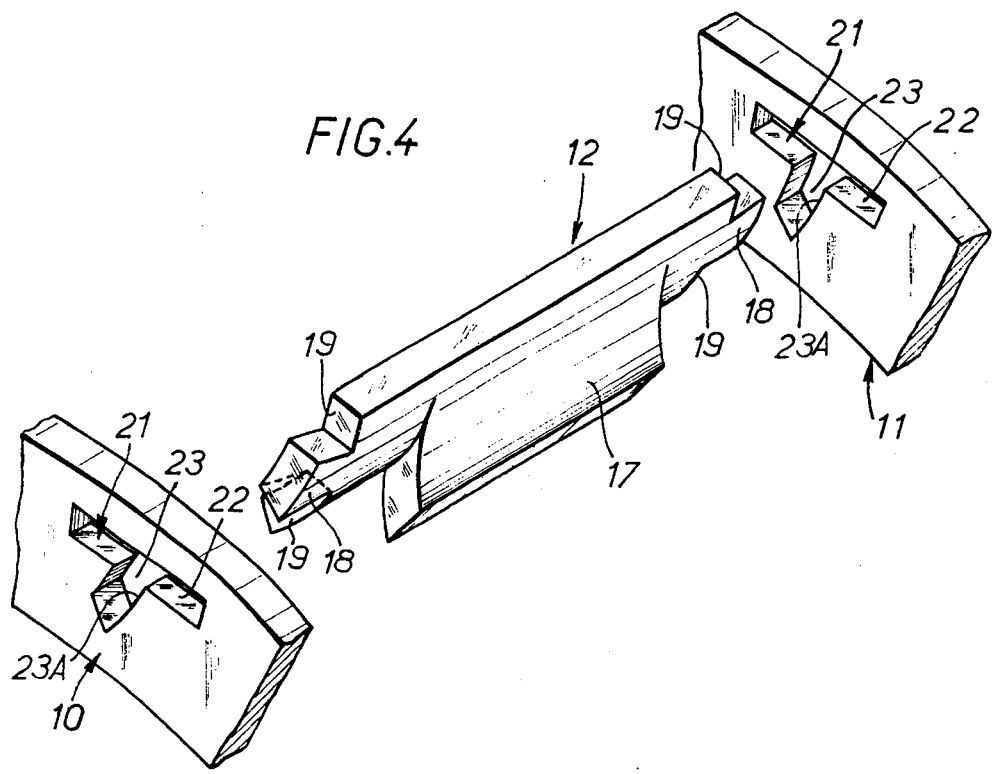
FIG. 4 is a view similar to that preceding, of the elements before their assembly.
Figure 5:
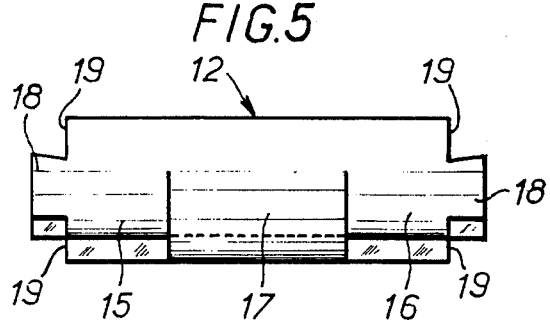
FIG. 5 is a view in elevation of a bar.
Figure 6:
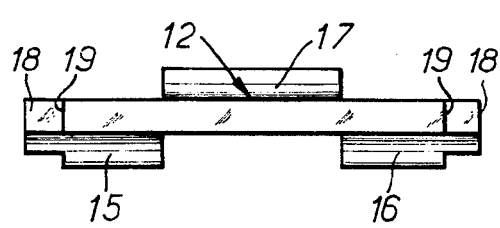
FIG. 6 is a view of this bar looking from above.
Figure 7:
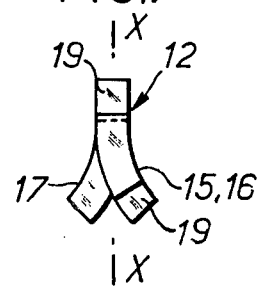
FIG. 7 is a view in profile.
Figure 8:
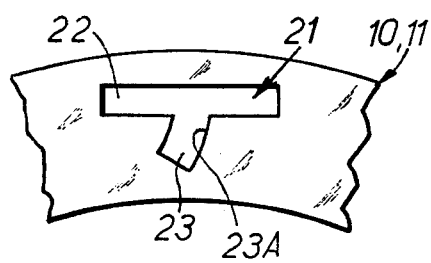
FIG. 8 shows the detail of an assembly port formed in the end-plates.
Figure 9:
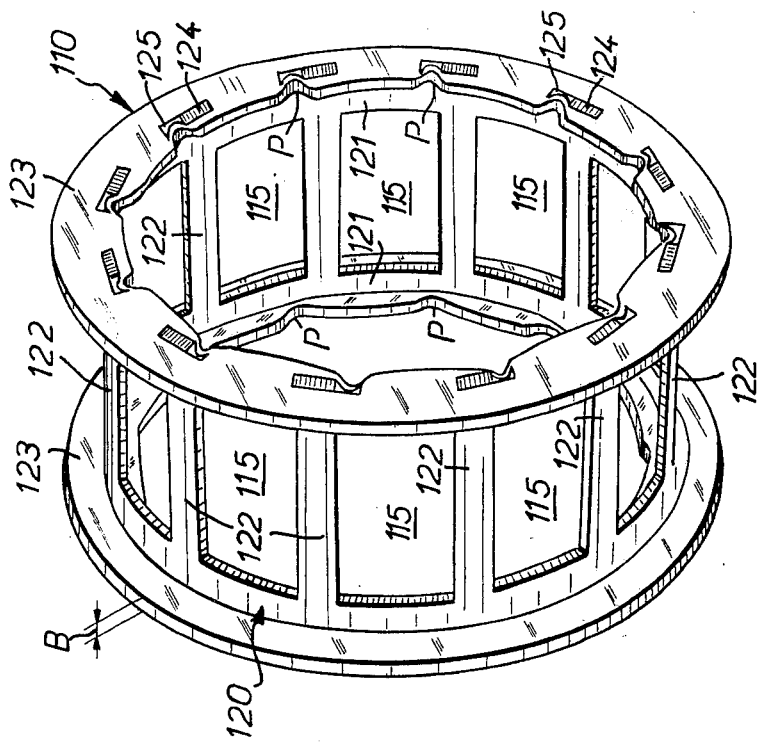
FIG. 9 is a general view in perspective of an alternative form of assembly cage according to the invention.
Figure 10:
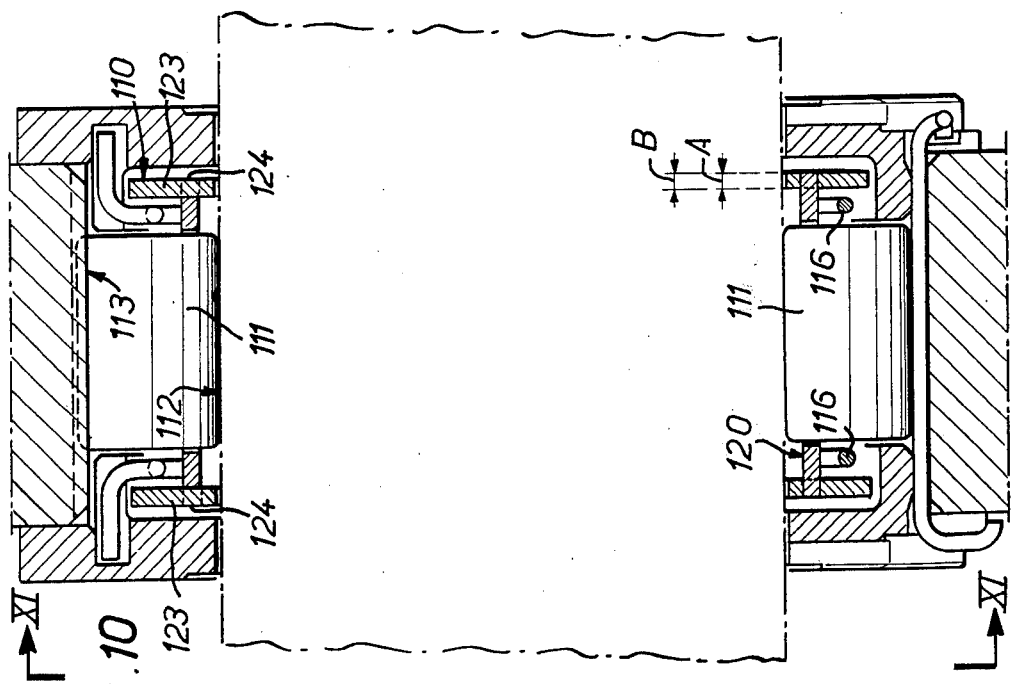
FIG. 10 is a view of a free-wheel comprising the said cage, in cross-section, taken along the broken line X—X of FIG. 11.
Figure 11:
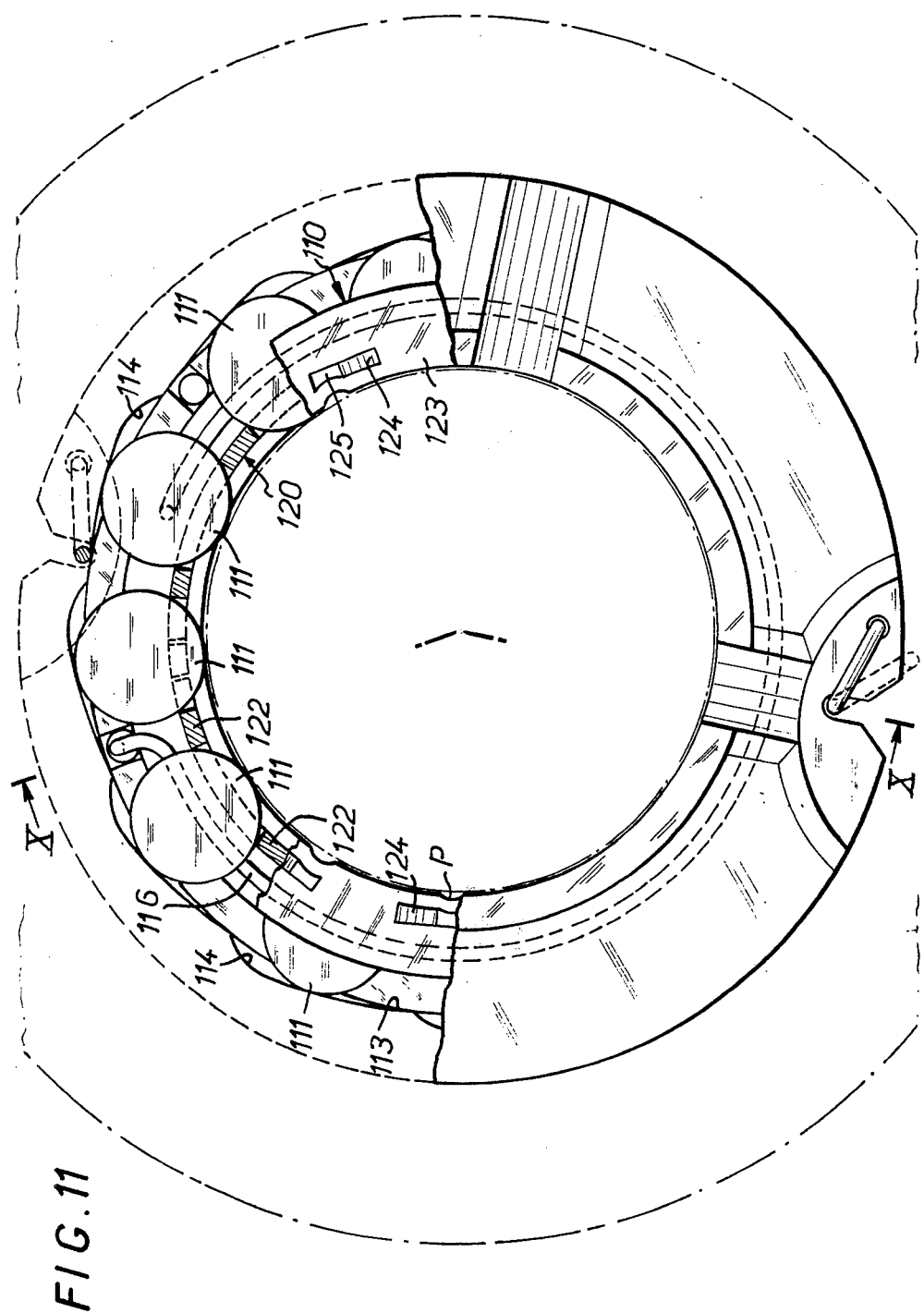
FIG. 11 is a view of this free-wheel with parts broken away, shown in elevation looking in the direction of the arrows XI—XI of FIG. 10.
Figure 12:
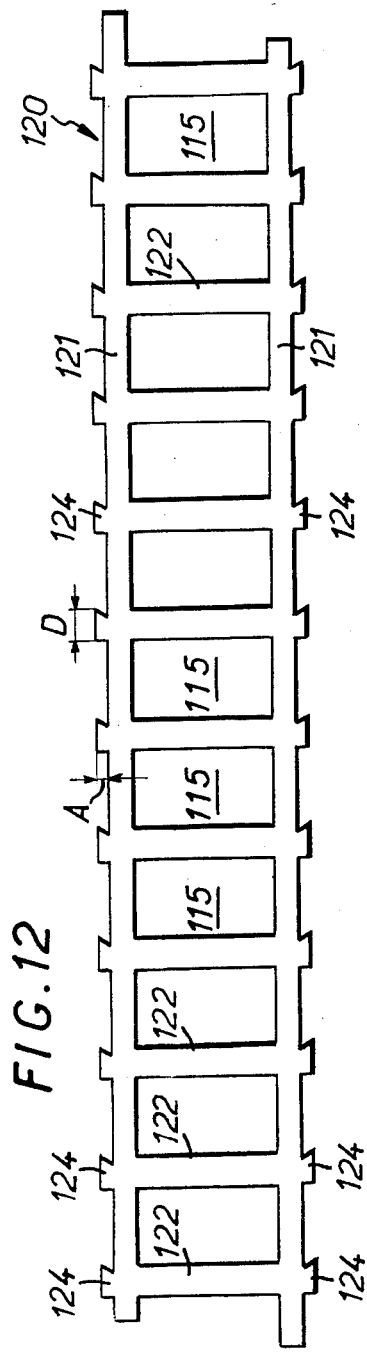
FIG. 12 shows the ladder before it is rolled.
Figure 15:
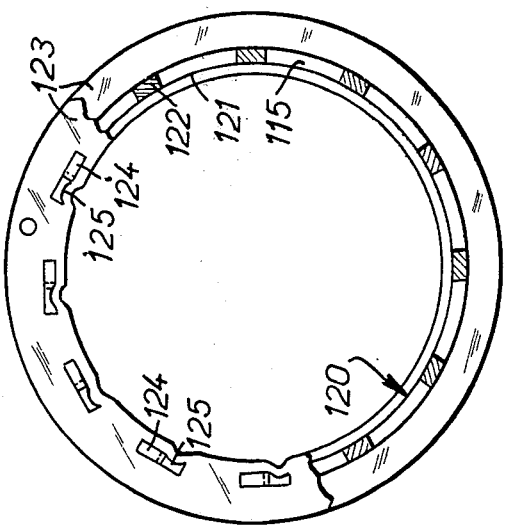
FIG. 15 shows the cage after assembly, with parts broken away.
Figure 14:
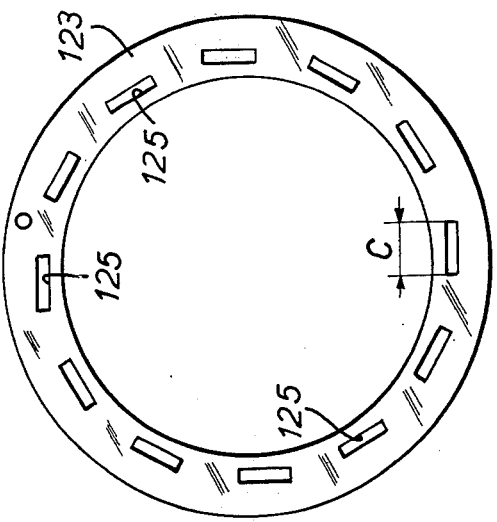
FIG. 14 shows one of the side-plates before its assembly with the ladder.
Figure 13:
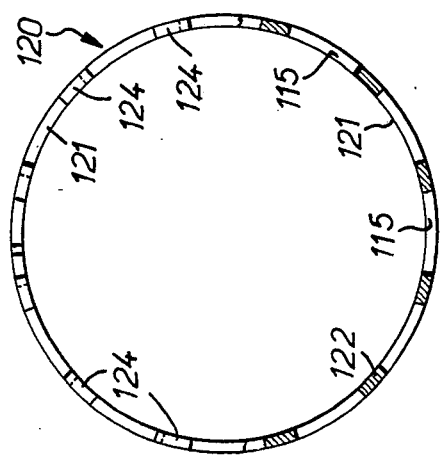
FIG. 13 shows the ladder after rolling.

The elements being thus prepared, the construction of the assembly cage is effected by engaging the dove-tails in the arms 23 of the openings 21, after which the final assembly with the end-plates is effected by applying to these latter at the level of each of the arms 22 of the openings 21 and on each side of the dove-tail, controlled pressures indicated diagrammatically at P and P1 in FIG. 3.

It should be observed that the substantially vertical arm 23 of the openings comprises a flank 23A adapted to co-operate with a complementary flank of the dove-tail. There is thus obtained the retention of the dove-tail in all directions, including the axial direction, by local deformation of the periphery of the end-plates at the level of each dove-tail, as is clearly shown at 30 and 31 of FIG. 3 and a rigid assembly of the bars with the end-plates is therefore obtained.

The bars may be provided with central and/or terminal projections which extend radially on each side of the said bars for the purpose of retaining rollers R in both radial directions.

Instead of having projections on each side of a general central plane, the bars could be provided with a unilateral projection, in one single piece or made-up of a number of parts.

Reference will now be made to FIGS. 9 to 17 which relate to an application of the invention to a free-wheel, or unidirectional coupling device. There can be seen in FIG. 9 a cage 110 for the assembly of the jamming and/or rolling devices, constituted in this case by rollers 111 (see FIGS. 10 and 11).

The rollers 111 co-operate with an inner cylindrical track 112 and with an outer track 113 which is provided with jamming ramps 114. The cage 110 is adapted to extend between the tracks 12 and 113 and has a generally-cylindrical shape (see FIG. 9) with a series of windows 115 in which are housed the rollers 111. The cage 110 is intended on the one hand to ensure a uniform circumferential distribution of the rollers 111 and on the other hand to permit a simultaneous release of the jamming of all the rollers 111.

The cage 110 is subjected to the action of springs 116 which facilitate the jamming conditions in the blocking direction, by permitting the release in the other direction.

The cage 110 comprises a central member 120 (see FIG. 12) in the form of a flat ladder having uprights 121 and rungs 122 in such manner as to define the series of windows 115. The ladder 120 is rolled-up cylindrically with an angular extent of 360° (see FIG. 13).

The cage 110 also comprises two flat annular lateral end-plates 123 on which the ladder 13 is assembled by crimping.

To this end, the ladder 120 is provided in the extension of the rungs 122, with lateral projections 124 (see FIG. 12) which are engaged in slots 125 in the end-plates 123 and are held rigidly fixed in these slots by crimping.

EAch projection 124 (see FIG. 12) has a length A which is substantially equal to the thickness B of each end-plate 123 (FIGS. 9 and 10) in such manner that after assembly, the projections 124 do not extend beyond the end-plates 123.

Each slot 125 is rectangular and elongated, with a length C (see FIG. 14) greater than the width D of each projection 124 (see FIG. 12) in such manner that the space E (see FIG. 16) is left in the slot 125 when the projection 124 is engaged therein (FIG. 16).

The projection 124 has the shape of a rectangular trapezium with a straight face 126 and an oblique face 127 and a large outer base. The wall of the slot 125 has a rectangular parallelipiped shape with two opposite faces 128 and 129. The projection 124 is engaged in the slot 125 in such manner that its straight face 126 is applied in flat contact against the wall 128 of the slot 125, which gives the space E the form of a wedge between the oblique face 127 of the projection 124 and the straight face 129 of the slot 125.

For assembly, the end-plate 123 is deformed by crimping its internal contour 130 (see FIG. 17) in the direction of its external contour 131, in such manner that the end-plate is allowed to penetrate at P into the space E, and to ensure an effective fixing of the end-plate 123 to the ladder 120, in all directions both circumferential, axial and radial.

It will be appreciated that the cage which has just been described is of particularly robust construction with a small number of parts, and it can be very easily constructed with great accuracy.

The ladder 120 may be made by punching from a blank sheet and then is conveniently wound so that the projections 124 are brought into coincidence with the slots 125 of the end-plates 123. The assembly may be effected in a single operation, which ensures on the one hand the penetration of the projections 124 into the slots 125 while bringing the faces 126 and 128 into contact, and on the other hand, an overall crimping effect at P for the penetration of the contour 120 into the spaces E.

In the form of embodiment illustrated by FIGS. 9 to 17, a single ladder 120 is provided with a cylindrical winding having an angular extent of 360°, but it is also possible to provide a number of ladders by placing them one after the other in such manner that their cylindrical rollings are additive and have as a whole an angular extent of 360°.

What I claim is:

1. An assembly cage for the jamming devices of a one-way coupling or free-wheel device, comprising two coaxial tracks, a said cage extending between said tracks and having a generally cylindrical form with a series of windows in which said devices are housed, said assembly cage further comprising two annular end-plates, bracing means which interconnect said end-plates and which define said circular series of windows, said bracing means having terminal portions including means for their assembly on said end-plates, the last-named means comprising at least one dove-tail engaged in an opening formed in each said plate, said opening being larger than the section of said terminal portion, said end-plates being radially deformed at the level of said openings, on at least one side of said dove-tails, thereby to fix together said assembly, said bracing means comprising a member in the form of a flat ladder comprising upright members and rungs, and rolled into a cylindrical shape, said ladder having lateral projections which constitute said assembly means, said projections being engaged in slots formed in said end-plates, in which they are held fixed, each said projection having the form of a trapezium with a large external base smaller than the said slot so as to leave a space when the projection is engaged therein.

2. An assembly cage as claimed in claim 1 in which the interior contour of said end-plate is deformed in the direction of the external contour.

3. An assembly cage as claimed in claim 1 in which the walls of said slot have the form of a rectangular parallelepiped, and in which said trapezium has the form of a rectangular trapezium with a large external base having a straight face so as to come into application in flat contact with one of the walls of said slot, and with an oblique face so as to give the space receiving the material of said end-plate the shape of a wedge suitable especially for the axial retention of the projection in said slot when once the end-plate has been deformed so as to penetrate into said space.

4. An assembly cage for the rolling members of a roller or like bearing, comprising two coaxial tracks, a said cage extending between said tracks and having a generally cylindrical form with a series of windows in which said members are housed, said assembly cage further comprising two annular end-plates, bracing means which interconnect said end-plates and which define the circular series of windows, said bracing means having terminal portions including means for their assembly on said end-plates, the last-named means comprising a dove-tail engaged in an opening formed in each said end-plate, said opening being larger than the section of said terminal portion, said end-plates being radially deformed at the level of said openings, on at least one side of said dove-tails, thereby to fix together said assembly, said bracing means comprising a member in the form of a flat ladder comprising upright members and rungs, and rolled into a cylindrical shape, said ladder having lateral projections which constitute said assembly means, said projections being engaged in slots formed in said end-plates, in which they are held fixed, each said projection having the form of a trapezium with a large external base smaller than the said slot so as to leave a space when the projection is engaged therein.

* * * * *